US010807653B2

(12) United States Patent
Marchlewski et al.

(10) Patent No.: US 10,807,653 B2
(45) Date of Patent: Oct. 20, 2020

(54) PICKUP BOX D-PILLAR ASSEMBLY

(71) Applicant: Ford Global Technologies, LLC, Dearborn, MI (US)

(72) Inventors: Jack Marchlewski, Saline, MI (US); Robert Reiners, Grosse Ile, MI (US); Dragan B. Stojkovic, Taylor, MI (US); Joshua R. Hemphill, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/278,414

(22) Filed: Feb. 18, 2019

(65) Prior Publication Data

US 2019/0185073 A1 Jun. 20, 2019

Related U.S. Application Data

(62) Division of application No. 15/335,506, filed on Oct. 27, 2016, now Pat. No. 10,259,509.

(51) Int. Cl.
*B62D 33/023* (2006.01)
*B60Q 1/30* (2006.01)
*B62D 33/03* (2006.01)

(52) U.S. Cl.
CPC .............. *B62D 33/023* (2013.01); *B60Q 1/30* (2013.01); *B62D 33/03* (2013.01)

(58) Field of Classification Search
CPC .. B62D 33/02; B62D 33/023; B62D 33/0273; B62D 33/03; B62D 25/2036; B62D 29/008

USPC .................................................... 296/193.06
See application file for complete search history.

(56) References Cited

U.S. PATENT DOCUMENTS

| | | |
|---|---|---|
| 6,237,211 B1 | 5/2001 | Clare et al. |
| 6,814,397 B2 | 11/2004 | Henderson et al. |
| 7,621,590 B2 | 11/2009 | Philip |
| 9,126,630 B1 | 9/2015 | Gallagher et al. |
| 9,145,176 B1 | 9/2015 | Van Wyk et al. |
| 9,422,010 B2 | 8/2016 | Boettcher et al. |
| 9,694,754 B2 | 7/2017 | Sterling |
| 9,757,825 B2 | 9/2017 | Courtright et al. |
| 9,758,199 B1 | 9/2017 | Marchlewski et al. |
| 10,046,810 B1 | 8/2018 | Marchlewski et al. |
| 2001/0038218 A1 | 11/2001 | Clare et al. |
| 2005/0225120 A1 | 10/2005 | Womack et al. |
| 2005/0242620 A1 | 11/2005 | McNulty et al. |
| 2007/0085381 A1 | 4/2007 | Delaney et al. |
| 2008/0258498 A1 | 10/2008 | Phillip et al. |
| 2014/0015283 A1 | 1/2014 | Freeman et al. |
| 2015/0367896 A1 | 12/2015 | Marchlewski et al. |

(Continued)

*Primary Examiner* — Hilary L Gutman
(74) *Attorney, Agent, or Firm* — David Coppiellie; Brooks Kushman P.C.

(57) ABSTRACT

A pickup truck box assembly includes a truck bed, an inner side panel, and a D-pillar. The truck bed is secured on a rear edge to a rear cross-member. The inner side panel is mounted to the truck bed. The D-pillar includes an inner part secured to the cross-member and inner side panel, and an outer part secured to the inner part and disposed between an outer side panel and the inner part. The D-pillar inner part includes a U-shaped portion and a first flange extending rearward substantially ninety degrees from the U-shaped portion in a plane substantially parallel to the side panel and a second flange extending from the U-shaped portion outboard of the inner side panel.

11 Claims, 5 Drawing Sheets

(56) References Cited

U.S. PATENT DOCUMENTS

2016/0121936 A1 5/2016 Patberg et al.
2017/0197671 A1 7/2017 Rompage et al.

PICKUP BOX D-PILLAR ASSEMBLY

CROSS-REFERENCE TO RELATED APPLICATIONS

This application is a divisional of U.S. application Ser. No. 15/335,506 filed Oct. 27, 2016, now U.S. Pat. No. 10,259,509 issued Apr. 16, 2019, the disclosure of which is hereby incorporated in its entirety by reference herein.

TECHNICAL FIELD

This disclosure relates to assemblies for supporting pickup truck boxes and components thereof.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly from the bed. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box components may often be made from steel sheet metal. The components may form assemblies of multiple parts including multiple assembly steps. Corners of the box also include an A-surface that has certain fit and finish requirements that may not be compromised by reinforcements that result in deformation or other surface imperfections.

This disclosure is directed to solving the above problems and other problems as summarized below.

SUMMARY

According to an aspect of the present disclosure, a pickup truck box assembly includes a truck bed, an inner side panel, and a D-pillar. The truck bed is secured on a rear edge to a rear cross-member. The inner side panel is mounted to the truck bed. The D-pillar includes an inner part secured to the cross-member and inner side panel, and an outer part secured to the inner part and disposed between an outer side panel and the inner part. The D-pillar inner part includes a U-shaped portion and a first flange extending rearward substantially ninety degrees from the U-shaped portion in a plane substantially parallel to the side panel and a second flange extending from the U-shaped portion outboard of the inner side panel. The D-pillar inner part may further include a cutout sized to receive the rear cross-member. The D-pillar inner part may have a first thickness and a second thickness greater than the first thickness. The second thickness may be located adjacent the cutout. The rear cross-member may have a base flange extending from a lower portion. The cutout may include a notch sized to receive the base flange. The D-pillar inner part and the outer part may be secured to one another such that a cavity is defined therebetween. The cavity may be sized to receive one of tail lamp wiring, a portion of a stake pocket component, a strut damper, a tie down attachment, and a bed extender attachment. The first flange of the D-pillar inner part may be oriented perpendicular relative to the rear cross-member. The first flange of the D-pillar inner part may have a thickness greater than other portions of the D-pillar inner part to reinforce a corner region of the pickup truck box adjacent a tailgate hinge assembly.

According to another aspect of the present disclosure, a pickup truck box assembly includes a truck bed, D-pillars, and a rear cross-member. The truck bed has forward and rear ends. The D-pillars are secured at respective corners of the rear end. Each of the D-pillars includes an inner part and an outer part. The inner part and the outer part have a uniform horizontal cross-section. A rear cross-member extends laterally beneath the truck bed between the D-pillars. Each of the D-pillar inner parts may include a flange extending outboard of an inner side panel of a pickup truck box. Each of the D-pillar inner parts may define a cutout sized to receive a portion of the rear cross-member. Each of the D-pillar inner parts may further define a notch sized to receive a base flange of the rear cross-member. Each of the D-pillar inner parts and the D-pillar outer parts may be formed by an extrusion process. Each of the D-pillar inner parts may include a region adjacent the rear cross-member having a thickness greater than a thickness of other portions of the D-pillar inner parts. Each of the D-pillar inner parts may include a flange extending rearward from a U-shaped portion of the D-pillar inner part. The flange may have a thickness greater than other portions of the D-pillar inner part to reinforce a corner region of a pickup truck box adjacent a tailgate hinge assembly.

According to a further aspect of the present disclosure, a vehicle pillar assembly for a truck bed having a side wall includes an inner pillar part and an outer pillar part. The inner pillar part includes a first pair of flanges. The outer pillar part includes a second wall and is assembled to the inner pillar part to form a polygonal box tube by a second pair of flanges that are attached to the first pair of flanges. The inner pillar part is attached to an inner panel of the side wall. The truck bed may further include a cross-member extending transversely across a rear edge of the truck bed. The inner pillar part may define a notch in a lower end of the first wall for receiving the cross-member. The inner pillar part and the outer pillar part may be secured to one another to define a cavity therebetween. The cavity may be sized to receive one of tail lamp wiring, a portion of a stake pocket component, a strut damper, a tie down attachment, and a bed extender attachment. Each of the first pair of flanges may extend from a U-shaped portion of the inner pillar part outboard of a truck box inner side panel. The inner pillar part and the outer pillar part may be extruded components. A first flange of the first pair of flanges may have a thickness greater than other portions of the inner pillar part to reinforce a corner region of a pickup truck box adjacent a tailgate hinge assembly.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
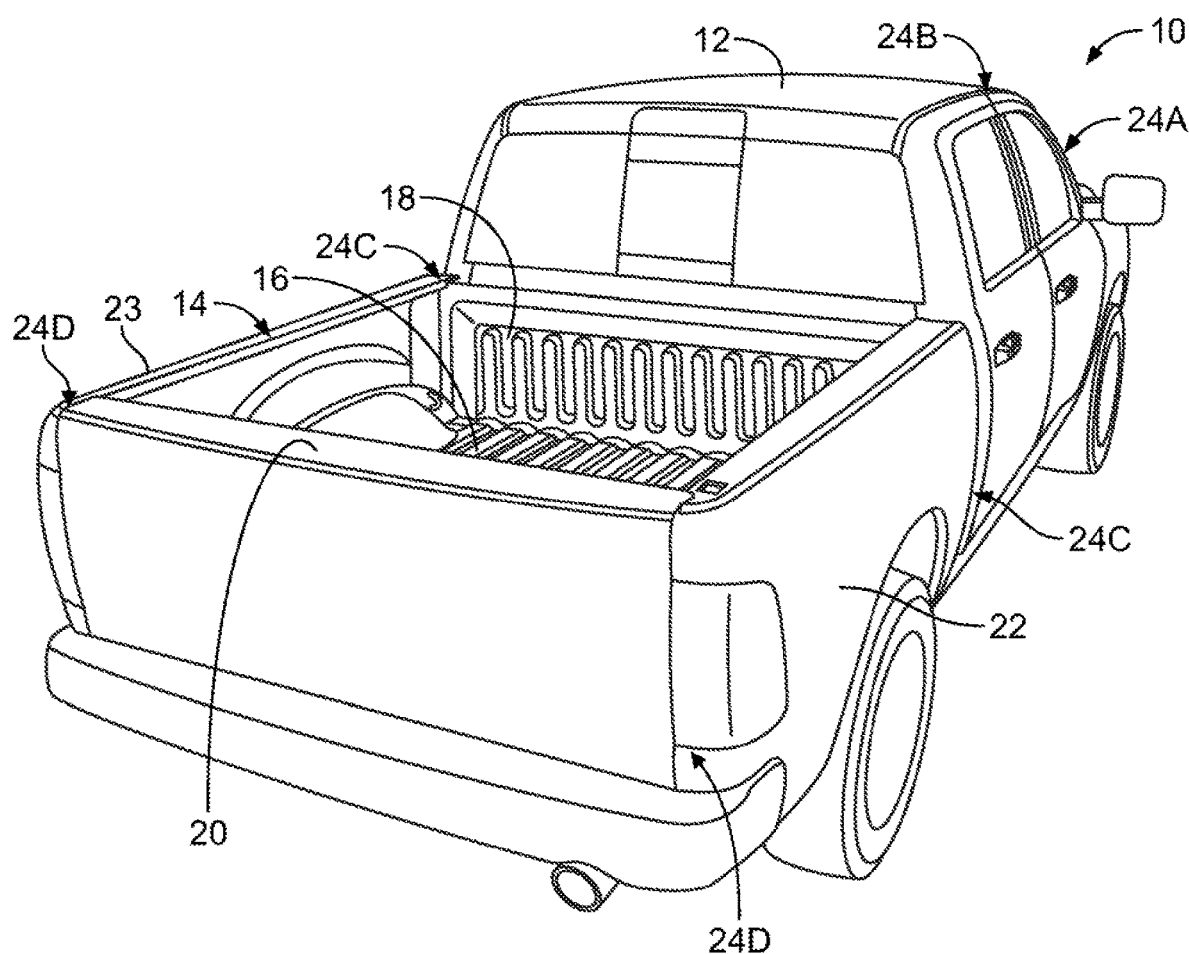
FIG. 1 is a rear perspective rear view of an example of a pickup truck.

Referring to FIG. 1, an example of a vehicle 10 is illustrated that includes a cabin 12 and a truck box 14 supported by a vehicle chassis (not visible in FIG. 1). The vehicle 10 may be, for example, a pickup truck comprising a majority of aluminum components. The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the bed 16. The bed 16 also supports a first outer side panel 22 and a second outer side panel 23. In this example, the vehicle 10 includes an A-pillar region 24a, a B-pillar region 24b, a C-pillar region 24c, and a D-pillar region 24d. The illustrated vehicle 10 is a four door configuration, however other configurations, such as a two door configuration, may be adopted to incorporate the disclosed concepts. Alternate configurations may include different pillar region references than the vehicle 10.

The first outer side panel 22 and the second outer side panel 23 are secured to the header 18 at respective regions referred to as forward box pillar regions of the truck box 14 or the C-pillar regions 24c herein. The tailgate 20 pivots between an open position and a closed position. In the closed position as shown in FIG. 1, each lateral end of the tailgate 20 may be removably attached to the first outer side panel 22 and the second outer side panel 23 at respective regions referred to as rear box pillar regions or the D-pillar regions 24d herein.

Figure 2:
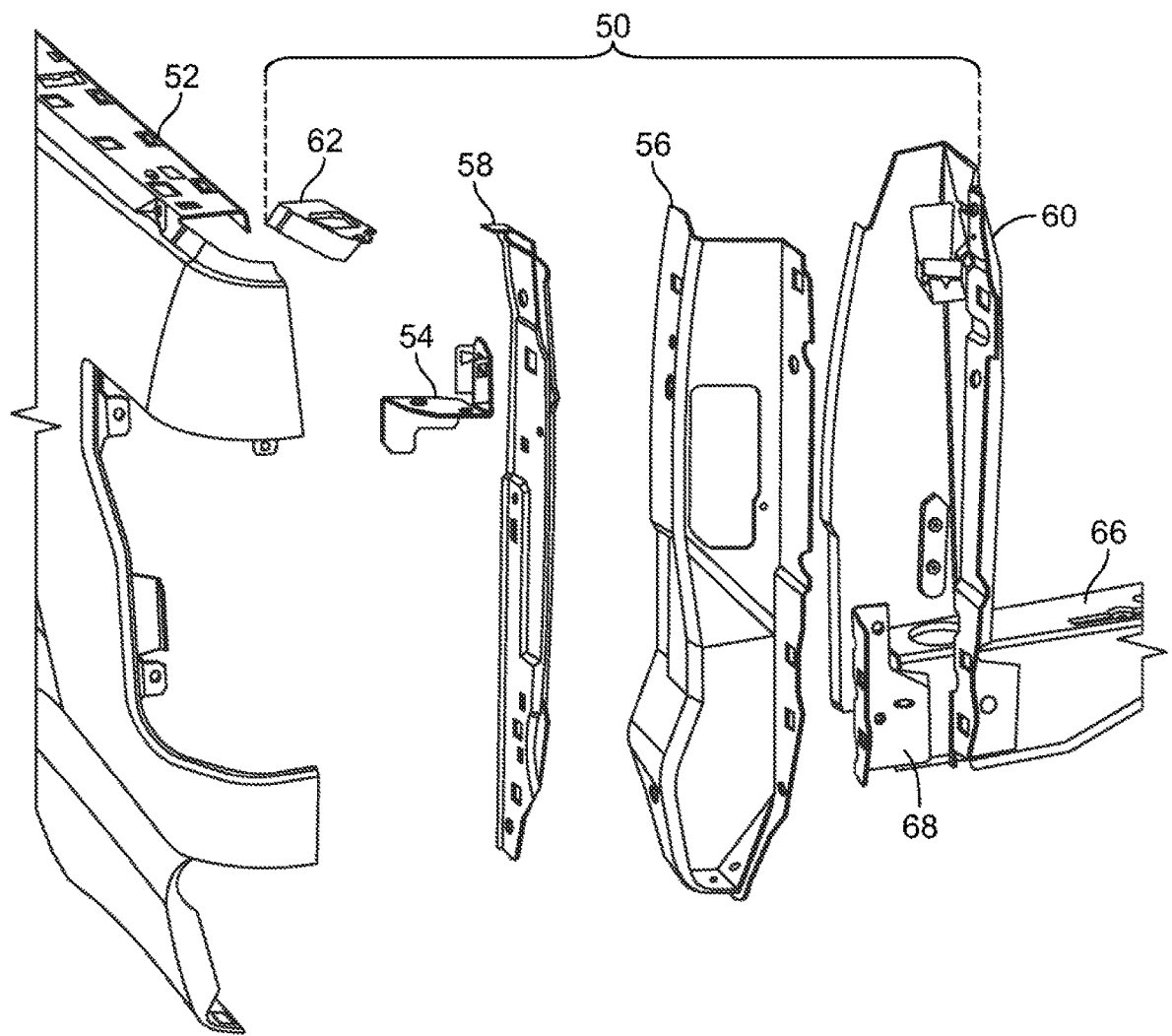
FIG. 2 is a fragmentary exploded view of a prior art example of a D-pillar assembly of a pickup truck.

FIG. 2 shows an example of a prior art D-pillar assembly for a pickup truck, referred to generally as a D-pillar assembly 50. The D-pillar assembly 50 is shown with an outer side panel 52. The D-pillar assembly 50 includes a striker reinforcement 54, a D-pillar outer 56, a box outer reinforcement 58, a D-pillar inner 60, a stake pocket reinforcement 62, and a reinforcement 68. A cross-member 66 is secured to the D-pillar assembly 50 at a lower portion of the D-pillar inner 60. The D-pillar outer 56 and the D-pillar inner 60 are be stamped components. The striker reinforcement 54, the stake pocket reinforcement 62, and the reinforcement 68 assist in providing stiffness to the D-pillar assembly 50.

Figure 3:
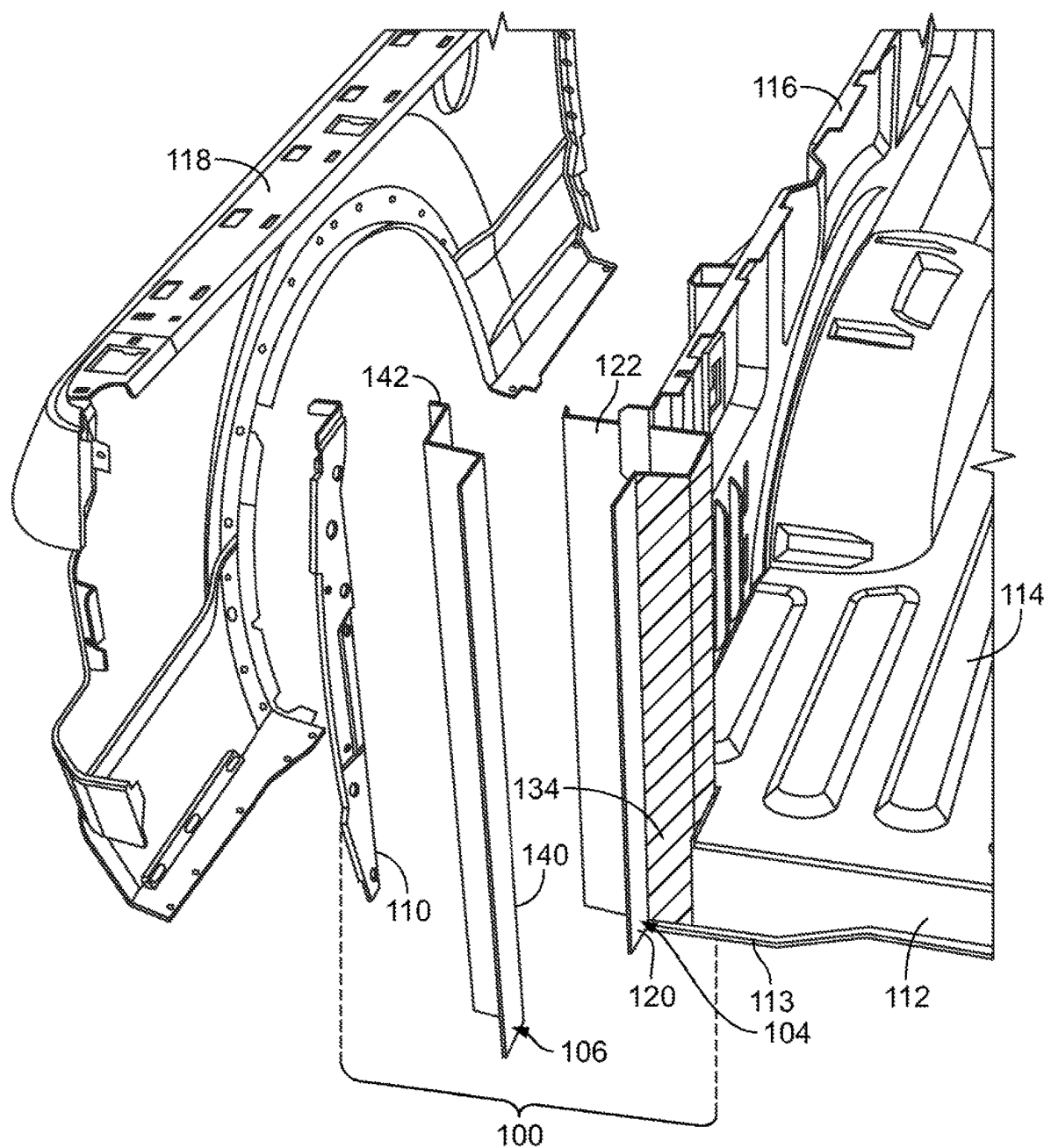
FIG. 3 is a partially exploded view of an example of a D-pillar assembly of a pickup truck shown with a D-pillar inner mounted to a portion of a pickup truck box.

FIG. 3 shows an example of a D-pillar assembly for a pickup truck, referred to generally as a D-pillar assembly 100 herein. The D-pillar assembly 100 may be mounted at a rear corner region of a pickup truck box, such as the D-pillar region 24d of the vehicle 10. The D-pillar assembly 100 includes an inner part such as a D-pillar inner 104, an outer part such as a D-pillar outer 106, and a box outer reinforcement 110 which may also be referred to as a swordfish component. Components of the D-pillar assembly 100 may be arranged with one another to reinforce a corner pillar region portion of a pickup truck box, such as the D-pillar region 24d. A cross-member 112 may be mounted to a frame (not shown). The cross-member 112 may include a flange 113 extending from a bottom portion of the cross-member. A truck bed 114 may be mounted on a rear edge to the cross-member 112 and support side panels of the pickup truck box. For example, the truck bed 114 and the cross-member 112 may support an inner side panel 116 and an outer side panel 118.

The D-pillar inner 104 and the D-pillar outer 106 may be formed of an aluminum alloy. Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties). The D-pillar inner 104 and the D-pillar outer 106 may be formed of six or seven thousand series aluminum. The D-pillar inner 104 and the D-pillar outer may be formed of other suitable series aluminum.

The D-pillar inner 104 and the D-pillar outer 106 may be formed by an extrusion process. For example, extrusion is a process to create components of a fixed cross-sectional profile. A material blank is pushed through a die of a desired cross-section after being heated. A ram of a press pushes the material blank toward and through the die. Previous D-pillar components are typically stamped, which may require additional reinforcement components in assemblies such as the D-pillar assembly 50. In comparison, extruded D-pillar components may have varied component thicknesses at various portions of the extruded D-pillar components such as the components of the D-pillar assembly 100. Each of the D-pillar outer 56 and the D-pillar inner 60 do not define fixed cross-section profiles. Extrusion processes are typically less complex than stamping processes and produce components with improved finishes compared to stamped components. The extruded components improve the appearance of the D-pillar assembly 100 compared to the D-pillar assembly 50 that includes multiple reinforcement components and rivets.

Figure 4A:
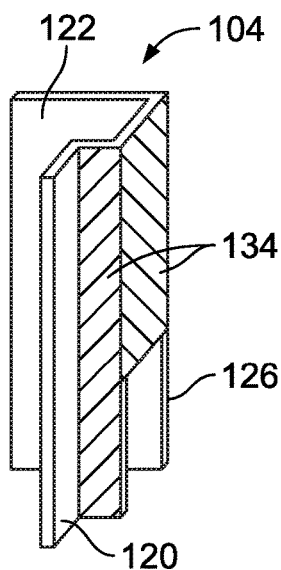
FIG. 4A is a perspective view of an example of a D-pillar inner of the D-pillar assembly of FIG. 3.
Figure 4B:
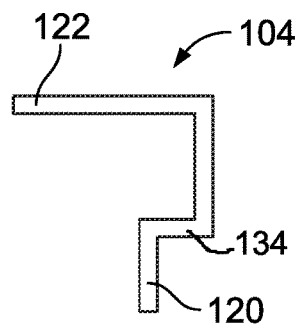
FIG. 4B is a plan view of the example of the D-pillar inner of the D-pillar assembly of FIG. 3.

FIG. 4A shows a perspective view of the D-pillar inner 104 in further detail. The D-pillar inner 104 defines a fixed cross-sectional profile. The D-pillar inner 104 includes a first flange portion 120 and a second flange portion 122. The D-pillar inner 104 may define a cutout 126 sized to receive a portion of the cross-member 112. A portion of the D-pillar inner 104 may define a U-shape. The first flange portion 120 may extend rearward substantially ninety degrees from a region 134 of the U-shaped portion and define a plane substantially parallel with planes defined by the inner side panel 116 and the outer side panel 118. The second flange portion 122 may extend from the U-shaped portion and outboard of the inner side panel 116 and is oriented perpendicular relative to the first flange portion 120. FIG. 4B shows the D-pillar inner 104 in a plan view.

Figure 4C:
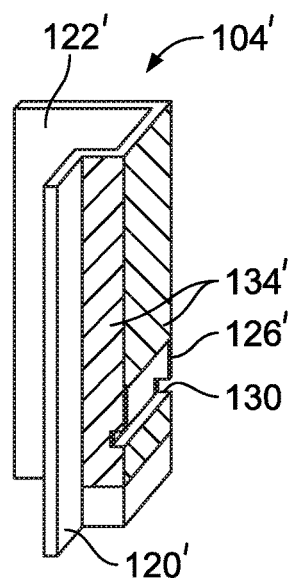
FIG. 4C is a perspective view of another example of a D-pillar inner which may be used with the D-pillar assembly of FIG. 3.

FIG. 4C shows another example of a D-pillar inner which may be used with the D-pillar assembly 100. A D-pillar inner 104' defines a fixed cross-sectional profile. The D-pillar inner 104' includes a first flange portion 120' and a second flange portion 122'. The D-pillar inner 104' may define a cutout 126' sized to receive a portion of the cross-member 112. The cutout 126' may further include a notch 130 sized to receive the flange 113 of the cross-member 112. A portion of the D-pillar inner 104' may define a U-shape. The first flange portion 120' may extend rearward substantially ninety degrees from the U-shaped portion and define a plane substantially parallel with planes defined by the inner side panel 116 and the outer side panel 118. The second flange portion 122' may extend from the U-shaped portion and outboard of the inner side panel 116 and is oriented perpendicular relative to the first flange portion 120'. In this example a machining process is utilized to form the cutout 126'.

As mentioned above, the D-pillar inner 104 may be formed by an extrusion process. As such, portions of the D-pillar inner 104 may have different thicknesses. For example, a region 134 (FIG. 4A) and a region 134' (FIG. 4C) of the portion of the D-pillar inner 104 defining the U-shape may have a thickness greater than a thickness of the other portions of the D-pillar inner 104. The greater thickness assists in reinforcing the area adjacent to cutout 126 and the cutout 126' and adjacent an area in which the D-pillar inner 104 or the D-pillar inner 104' is secured to the cross-member 112. For example, the region 134 and the region 134' maybe located adjacent a weld joining the respective D-pillar inner and the cross-member 112. As another example, the first flange portion 120 of the D-pillar inner 104 and the first flange portion 120' of the D-pillar inner 104', as extending rearward from the regions 134, 134', respectively, of the U-shaped portion, may have a thickness greater than a thickness of the other portions of the D-pillar inner 104. The greater thickness of the first flange assists in providing added reinforcement at a corner portion of a pickup truck box in an area that receives a load from, for example, a tailgate hinge assembly (not shown).

Figure 5A:
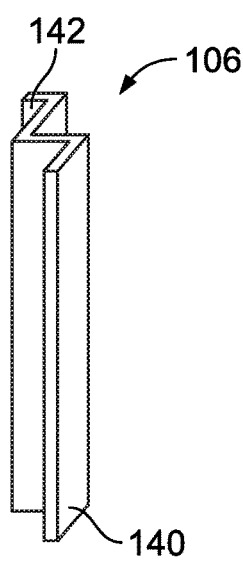
FIG. 5A is a perspective view of an example of a D-pillar outer of the D-pillar assembly of FIG. 3.
Figure 5B:
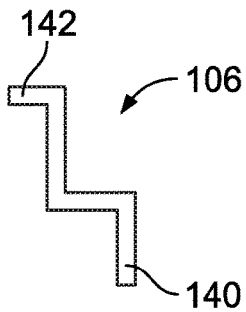
FIG. 5B is a plan view of an example of the D-pillar outer of the D-pillar assembly of FIG. 3.

FIGS. 5A and 5B show the D-pillar outer 106. The D-pillar outer 106 has a fixed cross-sectional profile. The D-pillar outer 106 includes a third flange portion 140 and a fourth flange portion 142. The third flange portion 140 assists in supporting a tailgate hinge portion, a tailgate striker, or a tailgate check cable. The third flange portion 140 of the D-pillar outer 106 is secured to the first flange portion 120 of the D-pillar inner 104. The fourth flange portion 142 of the D-pillar outer 106 may be secured to the second flange portion 122 of the D-pillar inner 104.

Figure 6:
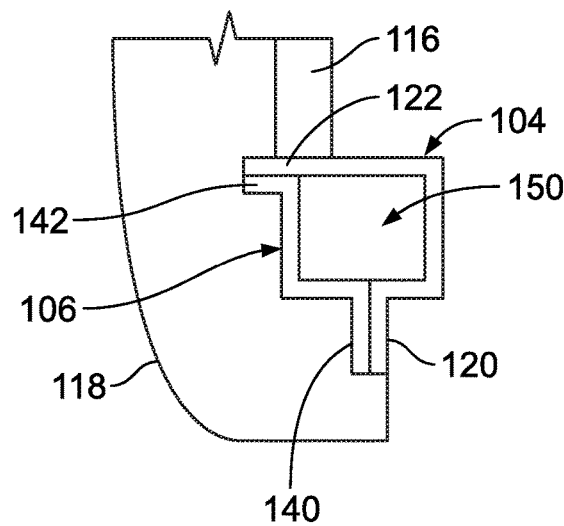
FIG. 6 is a plan view of components of the D-pillar assembly of FIG. 3 shown mounted to an outer panel and an inner panel of a pickup truck box.

FIG. 6 shows a plan view in which the D-pillar inner 104 is secured to the D-pillar outer 106. The D-pillar inner 104 and the D-pillar outer 106 are secured to the outer side panel 118. The D-pillar inner 104 and the outer panel 154 are secured to the inner side panel 116. The components may be secured to one another by various processes. For example, the components may be secured to one another by welding, clinching, riveting, or adhesive. The D-pillar inner 104 and the D-pillar outer 106 may be secured to one another to define a cavity 150. The cavity 150 may be sized to receive tail lamp wiring, a portion of a stake pocket component, a strut damper, a tie down attachment, or a bed extender attachment (not shown).

Figure 8:
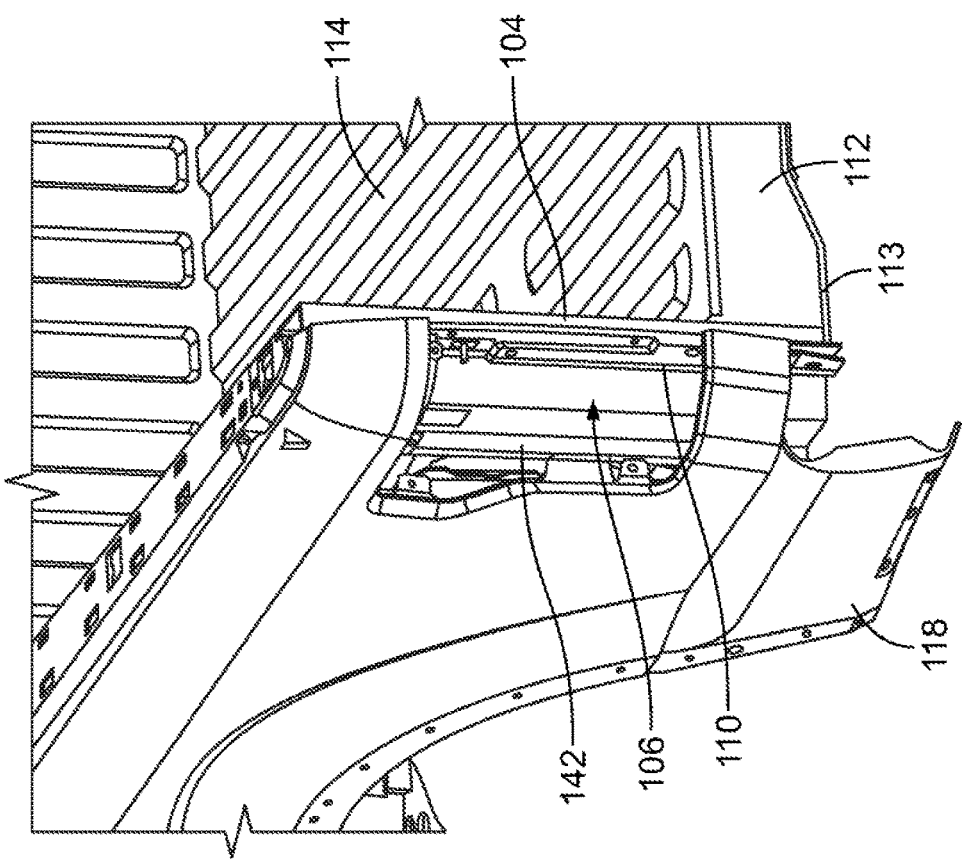
FIG. 8 is a second fragmentary perspective view of the example of the D-pillar assembly of FIG. 3 shown mounted to a corner region of a pickup truck box.
Figure 7:
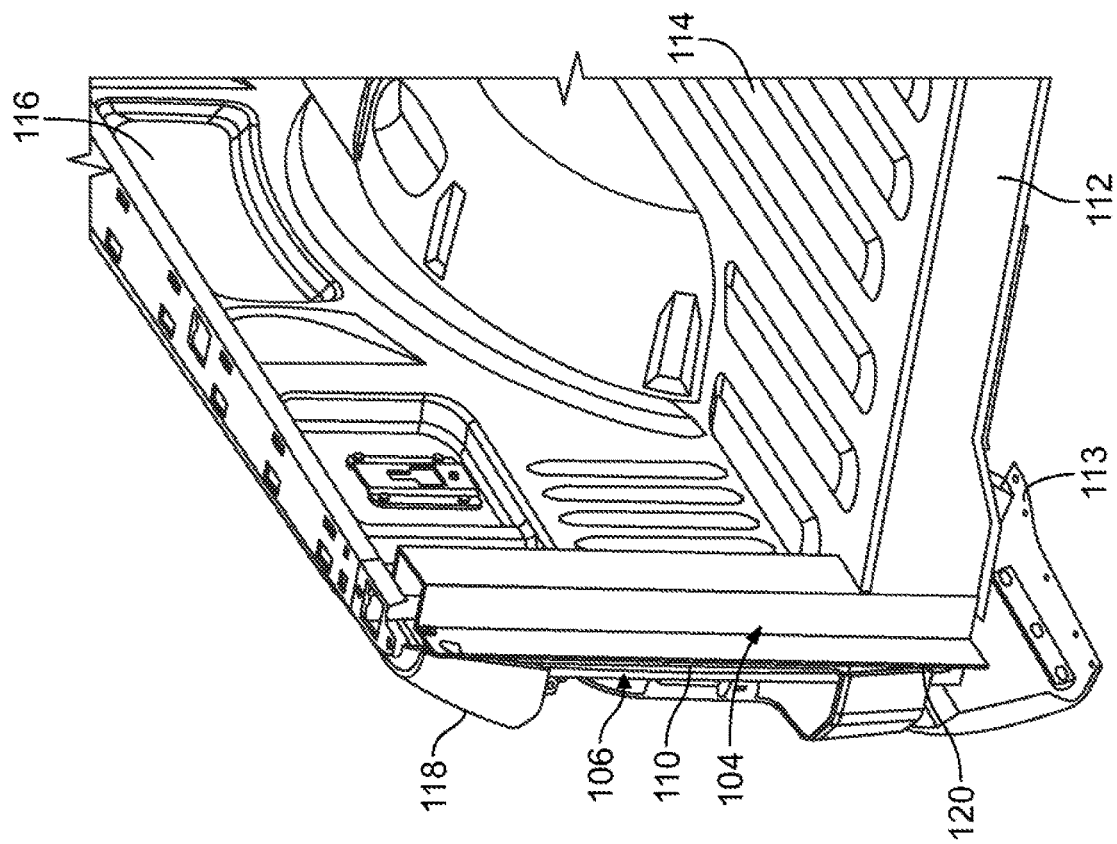
FIG. 7 is a first fragmentary perspective view of the example of the D-pillar assembly of FIG. 3 shown mounted to a corner region of a pickup truck box.

FIGS. 7 and 8 show how the D-pillar assembly 100 is mounted to the rear corner pillar region of a pickup truck box. For example, the D-pillar inner 104, the D-pillar outer 106 and the box outer reinforcement 110 are secured to one another and mounted to the outer side panel 118, the inner side panel 116, and the cross-member 112. The D-pillar inner 104 and the D-pillar outer 106 may be arranged with the cross-member 112 to provide structural reinforcement to the rear corner pillar region of the pickup truck box.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup truck box assembly comprising:
   a truck bed having forward and rear ends;
   D-pillars secured at respective corners of the rear end, each of the D-pillars including an inner part and an outer part, and each of the inner parts and the outer parts having a uniform horizontal cross-section; and
   a rear cross-member extending laterally beneath the truck bed between the D-pillars,
   wherein each of the D-pillar inner parts includes a region adjacent the rear cross-member having a thickness greater than a thickness of other portions of the D-pillar inner parts.

2. The assembly of claim 1, wherein each of the D-pillar inner parts includes a flange extending outboard of an inner side panel of a pickup truck box.

3. The assembly of claim 1, wherein each of the D-pillar inner parts defines a cutout sized to receive a portion of the rear cross-member.

4. The assembly of claim 3, wherein each of the D-pillar inner parts further defines a notch sized to receive a base flange of the rear cross-member.

5. The assembly of claim 1, wherein each of the D-pillar inner parts includes a region adjacent the rear cross-member having a thickness greater than a thickness of other portions of the D-pillar inner parts.

6. The assembly of claim 1, wherein each of the D-pillar inner parts includes a flange extending rearward from a U-shaped portion of the D-pillar inner part, and wherein the flange has a thickness greater than other portions of the D-pillar inner part to reinforce a corner region of a pickup truck box adjacent a tailgate hinge assembly.

7. A vehicle pillar assembly for a truck bed having a side wall, comprising:
- an inner pillar part including a first wall and a first pair of flanges; and
- an outer pillar part including a second wall and being assembled to the inner pillar part to form a polygonal box tube by a second pair of flanges that are attached to the first pair of flanges, wherein the inner pillar part is attached to an inner panel of the side wall,
- wherein a first flange of the first pair of flanges has a thickness greater than other portions of the inner pillar part to reinforce a corner region of a pickup truck box adjacent a tailgate hinge assembly.

8. The assembly of claim 7, wherein the truck bed further comprises a cross-member extending transversely across a rear edge of the truck bed, wherein the inner pillar part defines a notch in a lower end of the first wall for receiving the cross-member.

9. The assembly of claim 7, wherein the inner pillar part and the outer pillar part define a cavity therebetween and sized to receive one of tail lamp wiring, a portion of a stake pocket component, a strut damper, a tie down attachment, and a bed extender attachment.

10. The assembly of claim 7, wherein each of the first pair of flanges extend from a U-shaped portion of the inner pillar part outboard of a truck box inner side panel.

11. A pickup truck box assembly comprising:
- a truck bed having forward and rear ends;
- D-pillars secured at respective corners of the rear end, each of the D-pillars including an inner part and an outer part, and each of the D-pillar inner parts and the D-pillar outer parts having a uniform horizontal cross-section; and
- a rear cross-member extending laterally beneath the truck bed between the D-pillars,
- wherein each of the D-pillar inner parts includes a flange extending rearward from a U-shaped portion of the D-pillar inner part, and wherein the flange has a thickness greater than other portions of the D-pillar inner part to reinforce a corner region of a pickup truck box adjacent a tailgate hinge assembly.

\* \* \* \* \*